(12) United States Patent
Hamm

(10) Patent No.: US 6,263,133 B1
(45) Date of Patent: Jul. 17, 2001

(54) OPTICAL FOCUSING, COLLIMATING AND COUPLING SYSTEMS FOR USE WITH SINGLE MODE OPTICAL FIBER

(75) Inventor: Mark A. Hamm, Lynnfield, MA (US)

(73) Assignee: SciMed Life Systems, Inc., Maple Grove, MN (US)

(*) Notice: Subject to any disclaimer, the term of this patent is extended or adjusted under 35 U.S.C. 154(b) by 0 days.

(21) Appl. No.: 09/535,230

(22) Filed: Mar. 24, 2000

Related U.S. Application Data

(60) Provisional application No. 60/126,937, filed on Mar. 29, 1999.

(51) Int. Cl.[7] .............................. G02B 6/26; G02B 6/32
(52) U.S. Cl. .............................. 385/33; 385/15; 385/25; 385/34
(58) Field of Search .................... 385/15, 22, 23, 385/25, 33, 34

(56) References Cited

U.S. PATENT DOCUMENTS

| | | | |
|---|---|---|---|
| 5,371,814 | 12/1994 | Ames et al. | 385/25 |
| 5,815,614 | 9/1998 | Pan | 385/22 |
| 5,872,879 | 2/1999 | Hamm | 385/25 |
| 5,949,929 | 9/1999 | Hamm | 385/25 |
| 6,142,678 | * 11/2000 | Cheng . | |

* cited by examiner

Primary Examiner—Hung N. Ngo
(74) Attorney, Agent, or Firm—Lyon & Lyon LLP.

(57) ABSTRACT

Coupling devices for coupling a lens to a single mode optical fiber are disclosed. In one aspect, a lens alignment assembly is the coupling device and includes a single mode optical fiber, a lens, and a locating tube. The locating tube includes a hollow bore having an internal diameter such that the lens and single mode optical fiber are held in a tight, sliding fit within the locating tube. In another aspect, the device includes a single mode optical fiber located adjacent to a cylindrically shaped lens. The lens includes an angled facet having a reflective surface for directing light normal, or near normal, to the optical axis. The lens further includes a flat surface opposite the angle facet. The lens and single mode optical fiber are rotatable to scan a region of a biological surface. In another aspect, a rotatable optical fiber coupler includes a receptacle, a single mode optical fiber, and a GRIN rod lens having a portion thereof ground and polished such that the rod lens forms a tight, sliding fit within the receptacle. The rod lens, single mode optical fiber, and receptacle are all concentrically aligned with the optical axis. In still another aspect, the rotatable optical fiber coupler includes an aspheric lens.

36 Claims, 6 Drawing Sheets

OPTICAL FOCUSING, COLLIMATING AND COUPLING SYSTEMS FOR USE WITH SINGLE MODE OPTICAL FIBER

This application claims benefit of U.S. Provisional Application No. 60/126,937, filed on Mar. 29, 1999, which is incorporated by reference as if set forth fully herein.

BACKGROUND OF THE INVENTION

The field of the invention relates to coupling devices for coupling a lens to a single mode optical fiber. The field of the invention further relates to medical imaging devices incorporating such coupling devices.

Recently, substantial attention has been directed toward the development and implementation of imaging systems that provide optical feedback to the clinician. For example, optical feedback systems have been employed in intraluminal, intracavity, intravascular, and intracardiac treatment and diagnosis of medical conditions utilizing minimally invasive procedures. As one common example, these procedures are typically performed using imaging and treatment catheters that are inserted percutaneously into the body and into an accessible vessel of the vascular system at a site remote from a region of the body to be diagnosed and/or treated. The catheter can be equipped with an imaging device, typically located at the distal end thereof, that is used to locate and diagnose a diseased portion of the body.

In the past, medical imaging devices typically obtained images using an ultrasound imaging system. More recently, however, a growing interest has arisen in imaging devices employing optical coherence tomography (OCT). OCT is analogous to traditional ultrasound imaging techniques in that the technique measures back-reflected light rather than acoustical waves. OCT uses low coherence interferometry to perform high resolution, cross-sectional imaging of biological structures. OCT is a promising imaging method, in part, because OCT has a higher resolution than traditional ultrasound imaging techniques.

OCT devices are typically used in connection with one or more optical fibers in conjunction with an interventional device. The one or more optical fibers are attached to an imaging console that displays an image or a processor that interprets data. Potential applications of such systems include the stationary tissue spectroscopy of polyps and other mucosal tissue, linear scans of various portions of the human anatomy, and cross-sectional views of tubular vessels such as arteries, the gastro-intestinal tract, urological structures, the biliary tree, and neurological vessels. Of course, the examples mentioned above are only illustrative, as OCT imaging techniques can be used in applications other than those specifically set forth.

Procedures such as tissue spectroscopy typically utilize an endoscope, cytoscope, colonoscope, or sigmoidoscope for direct visual feedback. The scope typically helps direct a biopsy device, a light source, and an optical path for visual guidance. Other procedures involving optical feedback use guidewires. Still others use trocars for direct access to some parts of the anatomy, such as the breast for breast biopsies, and other areas inaccessible through an orifice.

In medical imaging devices using light as the radiation source, single mode optical fibers are often employed. In such applications, light from a source must be coupled into a single mode optical fiber, which requires optics to focus the light in a very small diameter. The transmitting area or core of an optical fiber is then aligned with the focused beam of light typically using multi-axis positioners with optical feedback systems. The lens is locked into place using epoxy or solder. Many factors affect the efficiency of coupling light into optical fibers, but one of the most critical is the accuracy of the alignment of the fiber axis with the optical axis of the lens system.

After light is coupled into a fiber, it is transported with relatively low losses within the single mode optical fiber to the desired location. When the optical fiber is terminated, light rays exiting the fiber are divergent, exiting the fiber within a narrow cone angle. The exiting light rays are then bent into the desired shape using one or more lenses. In prior art designs, various lens systems have been used to focus or collimate the light. Conventional optics sometimes require multiple lenses, each needing its own precision holder or positioning system. GRadient INdex (GRIN) lenses reduce the number of lenses required by bending the path of light within the lens. However, GRIN lenses also require complex and expensive positioning systems to provide efficient coupling into single mode optical fiber.

Conventional optical fibers utilize a stepped index of refraction to confine light within the core. The core, or area of the fiber that actually carries the light, is constructed with a lower index of refraction and the cladding (the outer glass layer) is made of a higher index of refraction. This causes light rays straying from the core to be reflected back into the core of the optical fiber with little loss. The core of single mode optical fiber ranges in size from about 3 microns up to 9 microns diameter.

Another type of optical fiber readily available is graded refractive index fiber. This fiber has no discrete core and cladding, rather a radially graded index of refraction causes the light to be bent back towards the center of the fiber, resulting in a sinusoidal path. For very short lengths, this fiber bends light exactly the same way the GRIN rod lenses do, so it can also be used as a lens. The advantages of using graded index fiber as a lens are, graded index fiber is available in the same diameter as single mode optical fibers, and they are extremely inexpensive.

In the field of minimally invasive surgery, catheters are often required with outer diameters that are limited to less than one millimeter. This restricts the use of conventional optics and in some cases even GRIN rod lenses due to the tiny diameters needed. When single mode optical fibers are used in these devices, there frequently is a need for focusing or collimating optics at the tip, or distal end of the device. Since the diameter into which light must be focused into is around 5 microns (0.0002"), aligning a lens with the required precision without the use of active alignment systems is difficult or impossible. A system is needed that eliminates the cost and complexity of this task.

In medical imaging devices incorporating single mode optical fiber, it is often desirable to rotate the optical fiber and/or any associated optical components to sweep the beam across a region of the body, i.e., the interior of an artery. Portions of the beam are reflected back through the use of optical lenses and reflectors. A separate analyzing device analyzes the data in the single mode optical fiber. By acquiring the rotational positioning of the optical fiber, an optical map can then be reconstructed, through mathematical algorithms, to produce detailed imaging data of the swept region. This imaging data can be displayed on a monitor for example, to provide real-time, or near real-time imaging.

One particular type of device that rotates a rotatable optical fiber is disclosed in U.S. Pat. No. 5,872,879. This patent is incorporated by reference as if set forth fully herein. Generally, a fiber-optic motor assembly is used to rotate the optical fiber within an insertion device (i.e., catheter, endoscope, guidewire, trocar, or the like).

When single mode optical fibers are employed, it is very difficult to align the optical lens with the single mode optical fiber with accuracy and precision. While time-consuming optical feedback-based systems are available to align single mode optical fibers with optical lenses, these devices and systems are complex and costly. Accordingly, there is a need for a compact, low cost optical lens system that permits focusing, collimating, and coupling into a single mode optical fiber.

SUMMARY OF THE INVENTION

In one aspect of the invention a lens alignment assembly is disclosed for coupling the lens to a single mode optical fiber. The lens alignment assembly includes a single mode optical fiber, the optical fiber having a certain outer diameter. A lens is positioned adjacent to one end of the optical fiber, the lens having a certain outer diameter. A locating tube surrounds the lens and at least a portion of the optical fiber. The locating tube has a hollow bore, the bore having an internal diameter such that the tube forms a tight, sliding fit with the outside diameters of the optical fiber and the lens so as to concentrically and axially align the lens and optical fiber.

In a second, separate aspect of the invention, a combined collimator and reflector is disclosed. The device includes a rotatable single mode optical fiber and a cylindrically shaped lens positioned adjacent to one end of the optical fiber, the lens further including an angled facet located on an end of the lens located opposite to the end of the lens adjacent to the optical fiber, the angled facet being coated with a reflective substance to form a reflective surface. A flat surface is located on the lens opposite the angled facet, the flat surface mitigating light refraction as light passes through the exterior surface of the lens.

In yet another separate aspect of the invention, a rotatable optical fiber coupler for single mode optical fiber is disclosed. The coupler includes a receptacle and a single mode optical fiber, the optical fiber being fixedly secured within the receptacle and concentric to the optical axis of the rotatable optical fiber coupler. A GRIN rod lens having a portion thereof ground and polished is insertable into the receptacle to form a tight, sliding fit within the receptacle, wherein the rod lens is positioned adjacent to one end of the optical fiber, and wherein the rotational axis of the rod lens, receptacle, and optical fiber is co-linear with the optical axis to minimize rotational modulation.

In still another separate aspect of the invention, a rotatable optical fiber coupler includes a receptacle, a single mode optical fiber and an aspheric lens. The single mode optical fiber is fixedly secured within the receptacle and concentric to the optical axis of the rotatable optical fiber coupler. An aspheric lens is positioned laterally adjacent to one end of the optical fiber, wherein the rotational axis of the rod lens, receptacle, and optical fiber is aligned with the optical axis to minimize rotational modulation.

DETAILED DESCRIPTION OF THE PREFERRED EMBODIMENTS

Figure 1:
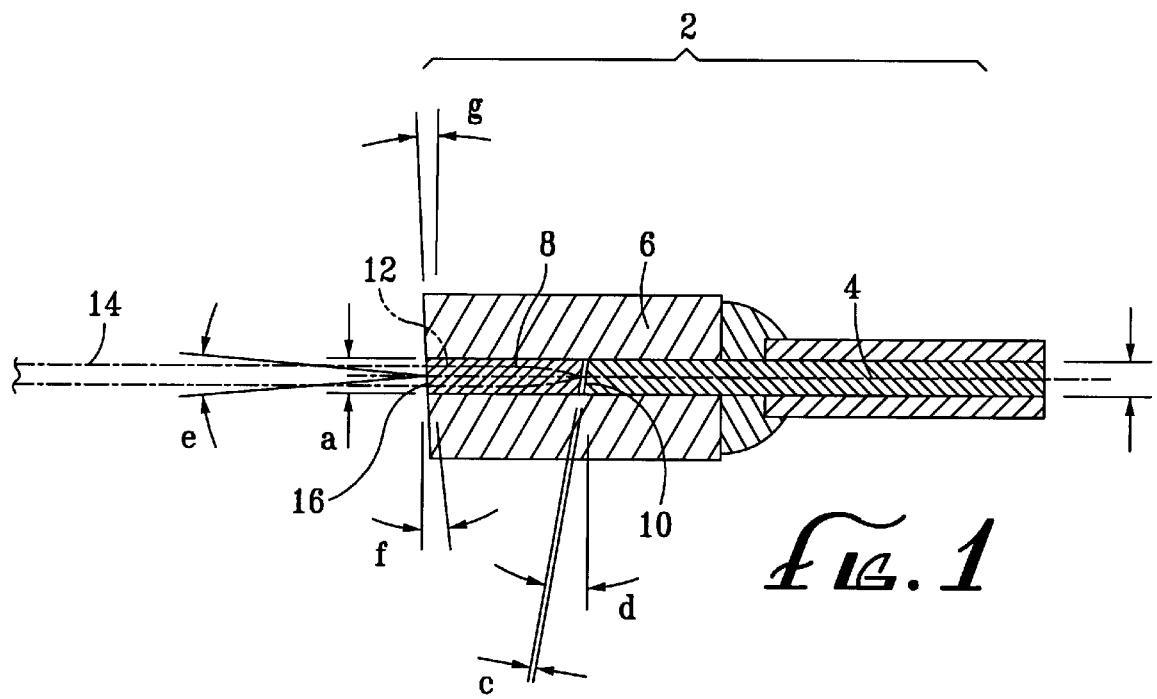
FIG. 1 is an axial cross-sectional view of the optical system that positions micro-miniature optics to collimate or focus light exiting from a single mode optical fiber.

Referring now to FIG. 1, an axial cross-sectional view of lens alignment assembly 2 is shown as a concentric, cylindrical assembly of single mode optical fiber 4, locating tube 6, and lens 8. Locating tube 6 may be fabricated from any rigid material with a hollow bore, having an inside diameter "a" that is formed to close tolerances with respect to diameter and straightness. By way of illustration, and not by way of limitation, the rigid material of locating tube 6 can be stainless steel, brass, ceramic, or the like. Inside diameter "a" of locator tube 6 forms a tight sliding fit with outside diameter "b" of both single mode optical fiber 4 and lens 8, providing a means of holding single mode optical fiber 4 and lens 8 concentrically and axially aligned. Single mode optical fiber 4 and lens 8 may physically abut together end to end, or, alternatively, a small gap "c" between fiber 4 and lens 8 may be desired. A refractive index matching gel or epoxy 10 may be placed between fiber 4 and lens 8 to minimize optical scattering and loss. An angle "d" on the ends of the fiber 4 and lens 8 may be desired to minimize back reflection, which could interfere with the transmitted optical signal. Still referring to FIG. 1, optical energy exiting from single mode optical fiber 4 exits in a cone shape at included angle "e", called the divergence angle, which is determined by the numerical aperture of single mode optical fiber 4. The divergent light enters lens 8 at included angle "e", and is subsequently bent by the radially graded index of refraction of lens 8 into a sinusoidal shaped path 12. Lens 8 may be set to various lengths to form light beam 14 with a varying cone angles that may be set between the negative cone angle of the single mode optical fiber 4, a focused beam, or, to the divergence angle "e" of the single mode optical fiber 4. The distal face 16 of lens 8 may also be polished at angle "f" to minimize back reflection. In addition, the lens 8 functions in either direction, so light entering distal lens face 16 within the cone angle "e" is focused by lens 8 into single mode optical fiber core 4. Distal face 16 of locator tube 6 may be polished at an angle "g" to position additional optics such as a mirror or prism to reduce unwanted back reflection.

Figure 1A:
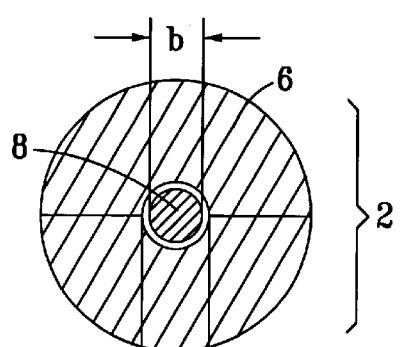
FIG. 1(a) is a radial cross-sectional view of the optical system shown in FIG. 1.

Referring now to FIG. 1(a), a radial cross-sectional view of the lens alignment assembly 2 is shown, including lens 8 concentrically mounted within locator tube 6. The inside diameter "a" of locator tube 6 is formed with a clearance of about 1 micron to about 5 microns around lens 8 outside diameter "b", which holds lens 8 concentrically and axially, with sufficient accuracy to align lens 8 with single mode optical fiber 4, which preferably has the same outside diameter "b" as lens 8. In this regard, the locator tube 6 forms a tight, sliding fit with the outer diameters of the lens 8 and single mode optical fiber 4.

Figure 2:
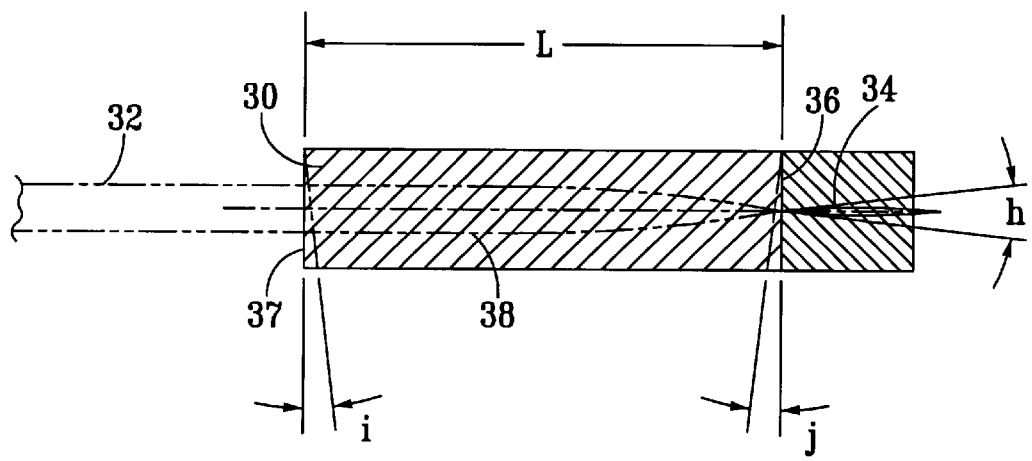
FIG. 2 is an axial cross-sectional view of the graded index fiber lens.

Referring now to FIG. 2, a one-quarter pitch graded index fiber lens 30 abutting against the end of a single mode optical fiber shown in axial cross-section. To produce a collimated beam 32, lens 30 is ground and polished to a specific length L determined by the outside diameter of the lens and the wavelength of light used. Light from single mode optical fiber 34 enters lens 30 through the end facet 36 within cone angle "h", which is determined by the numerical aperture of single mode optical fiber 34. Light is subsequently bent into sinusoidal path 38 within lens 30 by the radially graded index of refraction of lens 30. End facets 36 and 37 may be set to angles "i" and "j" to reduce back reflection. Lens 30 is referred to as a one quarter pitch lens because length 'L' is set such that light travels through one quarter of a full sinusoidal period, to produce a collimated beam 32 as light exits end facet 37. Conversely, if collimated beam 32 enters facet 37, the light is focused through sinusoidal path 38 and into single mode optical fiber 34. Most preferably, the outer diameter of the single mode optical fiber 34 and the outer diameter of the lens 30 are equal. In this regard, the equal outer diameters allows for the single mode optical fiber 34 and the lens 30 to be concentrically and axially aligned within a holding mechanism, such as the locator tube shown in FIG. 1.

Figure 2A:
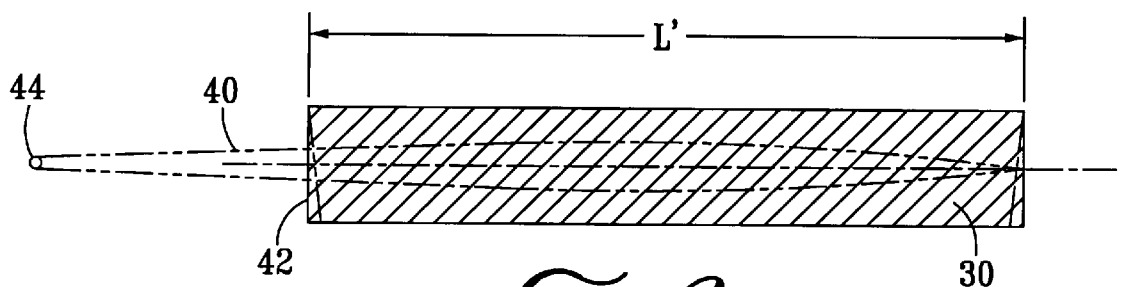
FIG. 2(a) is an axial cross-sectional view of a graded index fiber.

Referring now to FIG. 2(a), a longer length graded index fiber lens is shown in axial cross-section. Length L' is set to a length longer than the one-quarter pitch lens shown in FIG. 2. Light 40 exiting facet 42 is focused into a small spot 44, which can be as small as the core diameter of single mode optical fiber 34. This is useful because various beam shapes may be obtained by simply varying the length of the lens. For example, by altering the length of the lens 30, focused, unfocused (divergent), and collimated beams can be produced.

Figure 3:
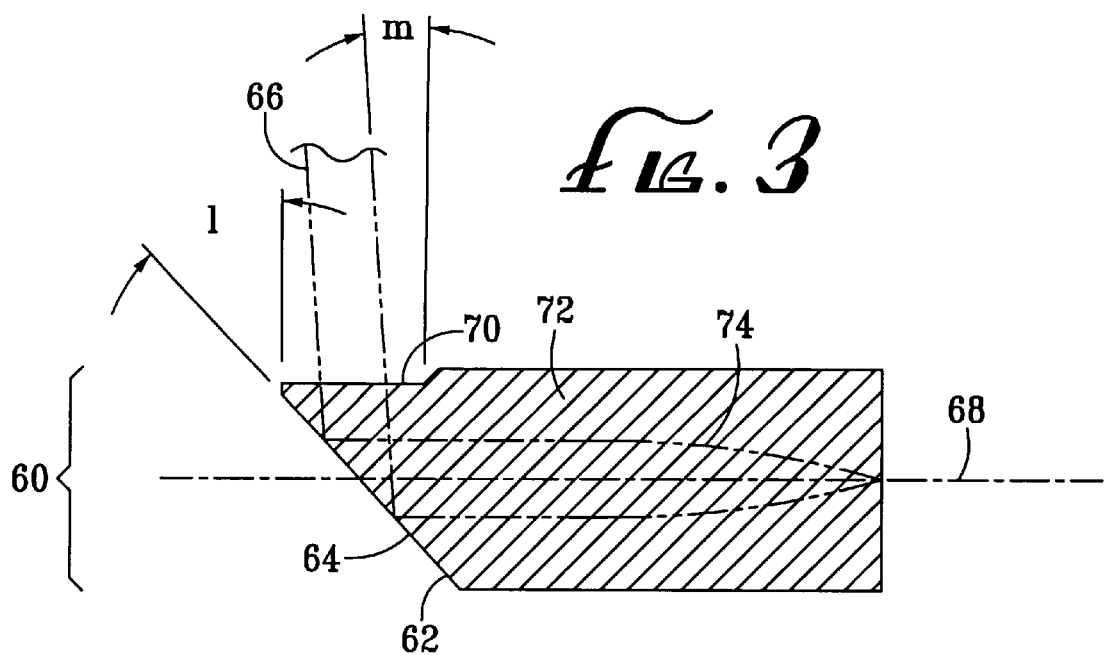
FIG. 3 is an axial cross-sectional view of the collimator and reflector.

Referring now to FIG. 3, collimator and reflector 60 is shown in axial cross-sectional view. The collimator and reflector 60 include lens 72. The distal end of collimator and reflector 60 is polished at angle "l" to create angled facet 62. Angled facet 62 is coated with a suitable reflective substance, such as aluminum 64 to reflect light beam 66 at angle "m" normal to the axis 68 of collimator and reflector 60. Other metals such as gold or silver may be used as the reflective substance. Flat 70 is polished opposite angled facet 62 to eliminate defocusing as light beam 66 exits the surface of the collimator and reflector 60. Similar to the configuration shown in FIG. 1, light exiting from a single mode optical fiber enters lens 72 and is subsequently bent into sinusoidal shaped path 74 by the radially graded refractive index of lens 72. Therefore, the length of lens 72 determines the shape of exiting light beam 66 for a given wavelength of light. Setting the appropriate length of lens 72 can produce a collimated or focused light beam 66. Additionally, positioning angled facet 62 at different positions with respect to sinusoidal shaped path 74 will affect the shape of light beam 66. Single mode optical fiber 72, as in FIG. 1, abuts against the end of lens 72 (side of lens 72 opposite angled facet 62).

Figure 3A:
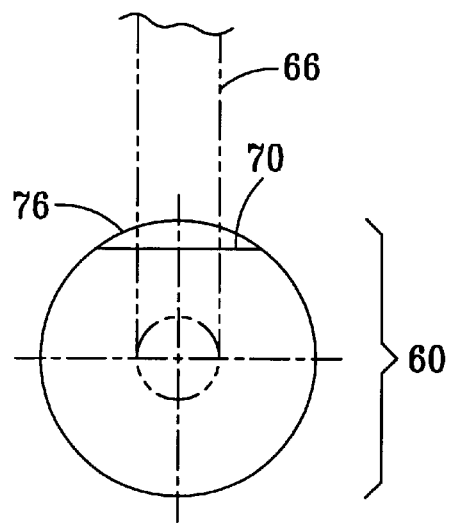
FIG. 3(a) is a radial cross-sectional view of the collimator and reflector.

Referring now to FIG. 3(a), the distal end view of a combined collimator and reflector assembly 60 is shown. Flat 70 is polished opposite angled facet 62 of lens 72 to eliminate defocusing of light beam 66 as it is refracted by the exterior surface of lens 72 in the flat 70 region. In this manner, the light does not pass through the outer cylindrical surface 76 of the lens 72. This is useful to reduce the number of interfaces that could cause unwanted back reflection as well as reduce the number of components and assembly operations therefore reducing the cost of the product.

Figure 4:
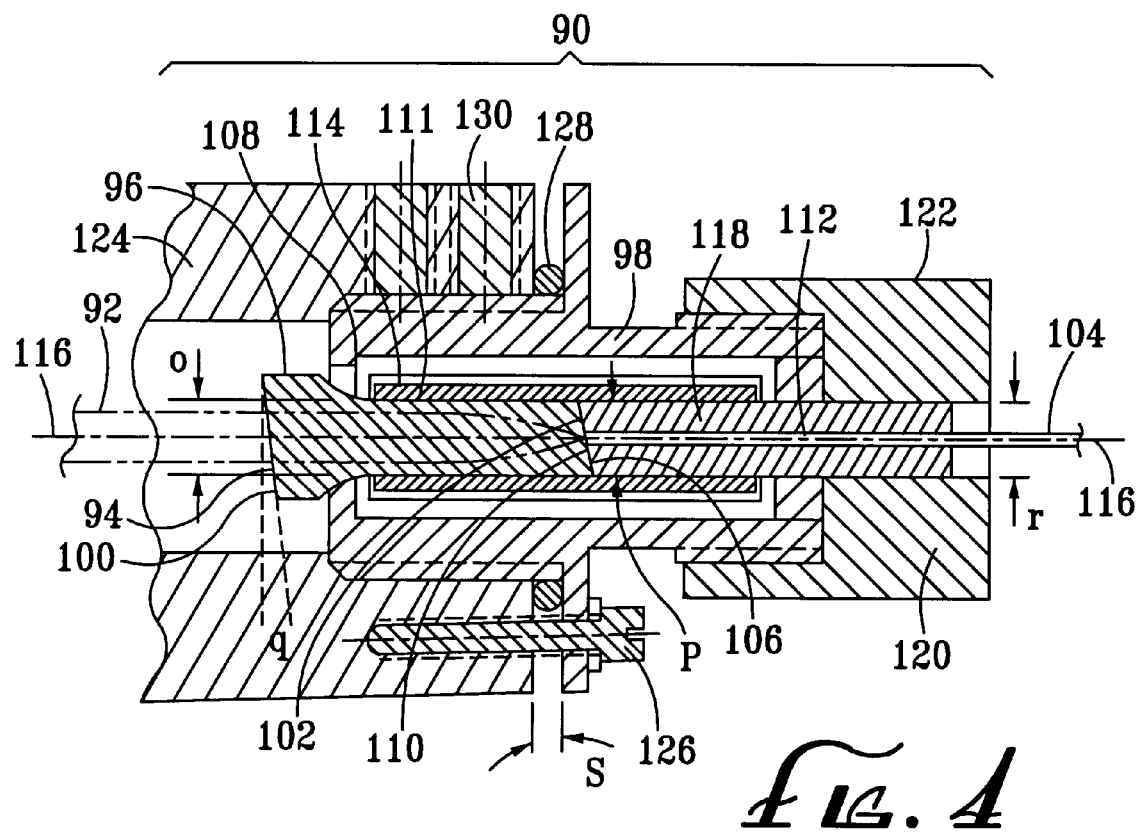
FIG. 4 is an axial cross-sectional view of the GRIN rod lens rotatable optical fiber coupler system.

Referring now to FIG. 4, an axial cross-sectional view of GRIN rod lens rotatable optical coupler 90 is shown. A collimated beam 92 enters proximal face 94 of GRIN rod lens 96. A portion of lens 96 outer diameter "o" has been precisely ground and polished with a size tolerance within the range of about 1 micron to about 5 microns. This portion of lens 96 is sized to fit with a tight, sliding fit into inside diameter "p" of telecommunications connector type commonly known to those skilled in the art as FC or SC receptacle 98. The proximal face 94 of GRIN rod lens 96 is preferably polished at angle "q", or coated with anti-reflection coating 100 to minimize back reflection.

Similarly, index matching material 102 may be placed between GRIN rod lens 96 and single mode optical fiber 104 to reduce back reflection from single mode optical fiber face 106. GRIN rod lens 96 bends the light within the lens 96 into a sinusoidal shaped path 108, therefore, for a given wavelength of light, the length of the GRIN rod lens 96 determines the shape and diameter of the light beam exiting distal face 110 of GRIN rod lens 96.

Still referring to FIG. 4, GRIN rod lens 96 focuses a collimated beam into single mode optical fiber 104. This length of one preferable GRIN rod lens is called a 0.25 pitch lens because light bends through one quarter of a full 360° sinusoidal shaped path. GRIN rod lens 96 is held in concentric and axial contact and alignment with single mode optical fiber 104 by tight, sliding fit. An optional epoxy 111 can used to secure the GRIN lens 96 in ceramic sleeve 114 of receptacle 98. Single mode optical fiber 104 is held concentric to optical axis 116 with ceramic ferrule 118 of the male portion of the FC or SC type connector 120. Outer diameter "r" is manufactured to fit tightly into receptacle 98 inside diameter "p", and is bonded into ferrule 118 with rigid epoxy 112. The proximal face of single mode optical fiber 104 and ferrule 118 may be set at an angle. In addition, the adjacent face of the GRIN rod lens 96 may be angled as well to reduce unwanted back reflection.

Still referring to FIG. 4, both mating halves of the FC or SC type connector assembly 122 rotate together after the connection is made, together with shaft 124. Receptacle 98 is attached using three screws 126, which are equally spaced about 120° in a bolt circle centered about axis 116 of coupler 90. Screws 126 also provide an angular adjustment "s" as screws 126 are tightened against o-ring 128. By individually adjusting screws 126 against o-ring 128, precise angular alignment of receptacle 98, single mode optical fiber 104 and GRIN rod lens 96 with respect to optical axis 116 of collimated beam 92 is obtained. Individual tightening of radial adjustment screws 130, allows precise concentric alignment of connector assembly 122, single mode optical fiber 104 and GRIN rod lens 96 with respect to optical axis 116 of collimated beam 92. The rotational axis of the GRIN rod lens 96, receptacle 98, connector ferrule 118 and single mode optical fiber 104 is precisely aligned with optical axis 116 to minimize undesired rotational modulation.

Figure 4A:
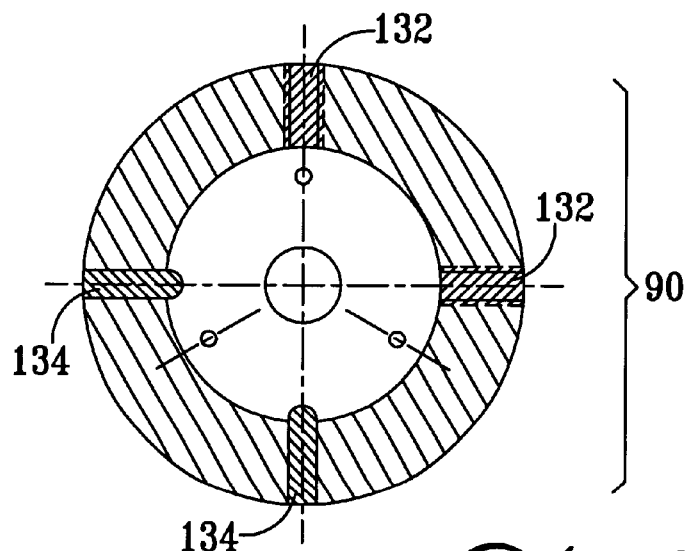
FIG. 4(a) is an end view of the GRIN rod lens rotatable optical fiber coupler system.

Referring now to FIG. 4(a), a radial cross-sectional view of rotatable optical fiber coupler assembly 90 is shown. Two set screws 132 are equally spaced at 90° from one another and spring plungers 134 are positioned 180° from set screws 132 to provide resistance and allow adjustment of the concentricity of connector assembly 122 and receptacle 98 with respect to optical axis 116. Set screws 132 and spring plungers 134 provide a relatively easy mechanism to adjust the concentric alignment of the single mode optical fiber 104.

Figure 5:
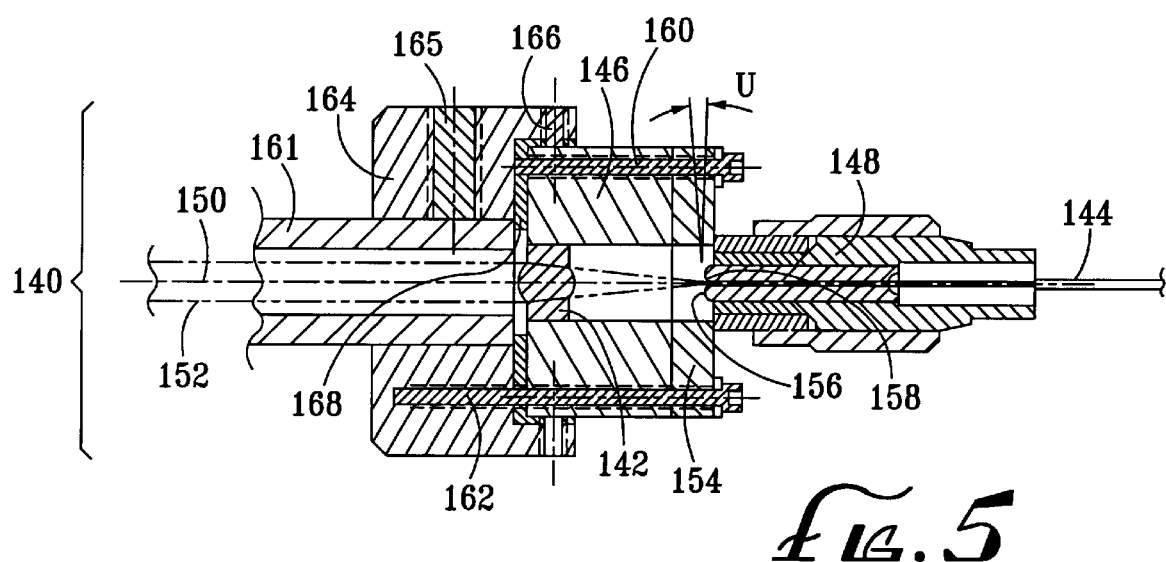
FIG. 5 is an axial cross-sectional view of the aspheric lens rotatable fiber coupler system.

Referring now to FIG. 5, a cross-sectional view of an aspheric lens rotary fiber coupler 140 is shown. This configuration may yield an improved coupling efficiency because the numerical aperture of aspheric lens 142 can be better matched to that of single mode optical fiber 144. Similar to the rotatable fiber coupler using a GRIN rod lens shown in FIG. 4, coupler 146 allows relative concentric and angular alignment of telecommunications type FC or SC single mode optical fiber connector 148 with respect to the optical axis 150 of free space beam 152. Aspheric lens fiber coupler 146 is mated and optically aligned by the manufacturer with FC or SC connector receptacle 154, which positions single mode optical fiber 144 inside telecommunications type connector 148. The aspheric lens 142 is preferably located laterally adjacent to one end of the single mode optical fiber 144, wherein free space separates the aspheric lens 142 and single mode optical fiber 144. The proximal face 156 of single mode optical fiber 144 may be coated with anti-reflection coating 158, or set at angle "u" to reduce back reflection. Two set screws 165 are preferably radially positioned at 90° apart and attach adapter 164 to a rotary shaft 161. Three screws 160 and three screws 162 are equally spaced at 120° around axis 150. Screws 162 attach coupler 146 to adapter 164, and individual adjustment of screws 162 allow precise angular alignment of coupler 146, which includes receptacle 154 and connector 148 with optical axis 150. Screws 160 provide a locking mechanism to fix coupler 146 in place after alignment. Set screws 166 provide concentric adjustment of coupler 146 and aspheric lens 142 with respect to optical axis 150. When the desired alignment is achieved, coupler 146 is locked in place with three screws 160 and/or epoxy 168.

Figure 5A:
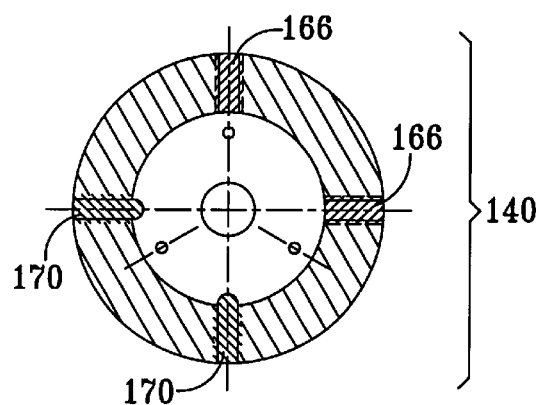
FIG. 5(a) is an end view of the aspheric lens rotatable fiber coupler system.

Referring now to FIG. 5(a), an end view of aspheric lens rotary fiber coupler 140 is shown. Spring plungers 170 are positioned 180° opposite set screws 166 to provide resistance and allow concentric adjustment of coupler 140 with respect to optical axis 150. Set screws 166 and spring plungers 170 provide a relatively easy mechanism to adjust the concentric alignment of the single mode optical fiber 144.

In devices where the single mode optical fiber 4, 34, 104, 144 is rotated, a drive unit or motor assembly is used to rotate the single mode optical fiber 4, 34, 104, 144. The drive unit or motor assembly attaches via a drive shaft or the like to the single mode optical fiber 4, 34, 104, 144, that, in turn, rotates within a catheter sheath or other interventional device. An optical element such as lens 8, 30, 72 is typically positioned on the distal end of the single mode optical fiber 4, 32, 104, 144. With respect to the collimator and reflector of FIGS. 3 and 3(a), the entire lens 72 preferably rotates with respect to its axis to scan 360°. In this regard, the interventional device can scan and image the entire 360° swept region. Alternatively, the lens 72 may shake back and forth to scan a arc or portion of 360°.

In contrast, as shown in FIG. 1, the lens alignment assembly 2 is forward looking, in that the light beam 14 enters and exits the lens 8 in the direction of the optical axis. The lens alignment assembly 2 may also be coupled with additional optical components such as a mirror, reflector, lens, refractive element or the like. The lens alignment assembly 2 may be used in rotating and non-rotating applications.

In the device of FIGS. 4 and 4(b), the GRIN rod lens coupler 90 is rotatable about the optical axis 116. The shaft 124, FC/SC connector assembly 122, the receptacle 98, the GRIN rod lens 96, and other components all rotate together with respect to the optical axis 116. As seen in FIG. 4, the only non-rotatable portion is collimated beam 92. The GRIN rod lens coupler 90 is located proximal to where the optical collimating/focusing lens or lenses are located. The GRIN rod lens coupler 90 thus serves as the interface device between the collimated beam of light 92 and the rotatable single mode optical fiber 104.

Referring now to FIGS. 5 and 5(a), the aspheric lens rotary fiber coupler 140 also serves as the interface devices between the free space beam 152 and the rotatable single mode optical fiber 144. In this device, the adapter 164, the connector 148, coupler 146, aspheric lens 142, and single mode optical filter 144, among other components, all rotate with respect to optical axis 150. The non-rotatable portion is the free space beam 152.

Figure 6:
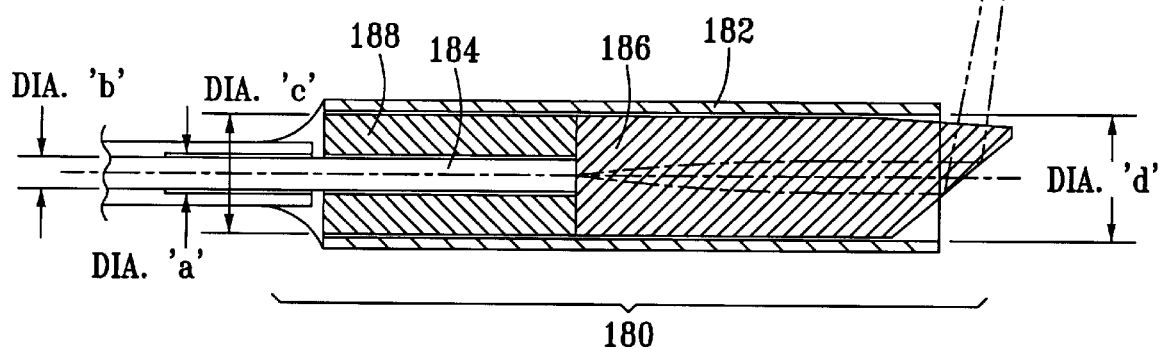
FIG. 6 is an axial cross-sectional view of a lens alignment assembly including a lens, an optical fiber, and a concentric tube.
Figure 6A:
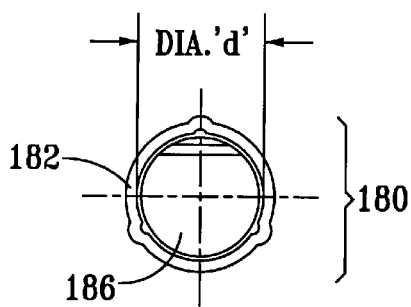
FIG. 6(a) is an end view of the lens alignment assembly.

Referring now to FIGS. 6 and 6(a), a lens alignment assembly 180 is illustrated. This lens alignment assembly 180 is preferably used when relatively larger lens is used. The lens alignment assembly 180 includes a locating tube 182 the holds an optical fiber 184 and a lens 186. Preferably, the lens 186 is a GRIN rod lens. A concentric tube 188 is advantageously positioned external to the optical fiber 184 and inside the locating tube 182. The concentric tube 188 is used to adapt or expand the a relatively small diameter optical fiber 184 to match the diameter of the larger lens 186. Preferably, the concentric tube 188 is made of an optically transparent material. One preferred material is glass in form of a capillary or the like. This embodiment is particularly useful where larger lens apertures are used. The larger diameter of the lens 186 provides a larger aperture, thus increasing the amount of light collected and coupled into the optical fiber 184.

Preferably, concentric tube 188 is uniform throughout its length. The concentric tube 188 has an inner diameter "a" sized to provide a tight, sliding engagement with the outer diameter "b" of the optical fiber 184. In addition, the concentric tube 188 also has an outer diameter "c" that is sized to closely match the outer diameter of the lens 186. Preferably, the outer diameter "c" is equal to the outer diameter of the lens 186. The locating tube 182 has an inner diameter "d". Preferably, the outer diameter "c" of the concentric tube 188 and the inner diameter "d" of the locating tube 182 are designed in such a manner as to provide a tight, sliding engagement between the concentric tube 188 and the locating tube 182. The lens 186 is also held in a tight, sliding engagement within the locating tube 182.

FIG. 6(a) illustrates an end view of the lens alignment assembly 180. The inner diameter "d" of the locating tube 182 can be a straight diameter as drilled, reamed or drawn. Alternatively, the inner diameter "d" can be sized by crimping the locating tube 182 onto a sizing mandrel to provide enough contact with the lens 186 and the concentric tube 188 to maintain accurate alignment and proper concentricity.

While embodiments of the present invention have been shown and described, various modifications may be made without departing from the scope of the present invention, and all such modifications and equivalents are intended to be covered.

What is claimed is:

1. A lens alignment assembly coupling the lens to a single mode optical fiber comprising:

a single mode optical fiber, the optical fiber having a certain outer diameter;

a lens positioned adjacent to one end of the optical fiber, the lens having an outer diameter equal to the outer diameter of said single mode optical fiber; and a locating tube surrounding the lens and at least a portion of the optical fiber, the locating tube having a hollow bore, the bore having an internal diameter such that the tube forms a tight, sliding fit with the outside diameters of both the optical fiber and the lens so as to concentrically and axially align the lens and the optical fiber.

2. A lens alignment assembly according to claim 1, wherein the optical fiber and the lens physically abut together in an end-to-end arrangement.

3. A lens alignment assembly according to claim 1, wherein a small gap is formed between the adjacent ends of the optical fiber and the lens.

4. A lens alignment assembly according to claim 3, wherein a refractive index matching gel is located in the small gap.

5. A lens alignment assembly according to claim 3, wherein a refractive index matching epoxy is located in the small gap.

6. A lens alignment assembly according to claim 1, wherein the adjacent ends of the optical fiber and the lens are angled to minimize back reflection.

7. A lens alignment assembly according to claim 1, wherein the end of the lens located opposite to the end of the lens adjacent to the optical fiber is angled to minimize back reflection.

8. A lens alignment assembly according to claim 1, wherein the bore of the locating tube has an internal diameter that is larger than the outer diameter of the optical fiber and the lens within the range of about 1 micron to about 5 microns.

9. A lens alignment assembly according to claim 1, wherein the lens is a collimating lens.

10. A lens alignment assembly according to claim 9, the lens being a one-quarter pitched graded index fiber lens.

11. A lens alignment assembly according to claim 1, wherein the lens is a focusing lens.

12. A combined collimator and reflector comprising:
a rotatable single mode optical fiber;
a cylindrically shaped lens positioned adjacent to one end of the optical fiber, the lens further including:
(a) an angled facet located on an end of the lens located opposite to the end of the lens adjacent to the optical fiber, the angled facet coated with a reflective substance to form a reflective surface; and
(b) a flat surface located on the lens opposite to the angled facet, the flat surface mitigating light refraction as light passes through the exterior surface of the lens.

13. A combined collimator and reflector according to claim 12, wherein the lens is a collimating lens.

14. A combined collimator and reflector according to claim 12, wherein the lens is a focusing lens.

15. A combined collimator and reflector according to claim 12, wherein the optical fiber and the lens physically abut together in an end-to-end arrangement.

16. A combined collimator and reflector according to claim 12, wherein a small gap is formed between the adjacent ends of the optical fiber and the lens.

17. A combined collimator and reflector according to claim 12, wherein a refractive index matching gel is located in the small gap.

18. A combined collimator and reflector according to claim 12, wherein a refractive index matching epoxy is located in the small gap.

19. A combined collimator and reflector according to claim 12, wherein the reflective substance is a metal selected from the group consisting of aluminum, gold, and silver.

20. A rotatable optical fiber coupler for single mode optical fiber comprising:
a receptacle;
a single mode optical fiber, the optical fiber being fixedly secured within the receptacle and concentric to the optical axis of the rotatable optical fiber coupler; and
a GRIN rod lens, the rod lens having a portion thereof ground and polished that is insertable into the receptacle to form a tight, sliding fit within the receptacle, wherein the rod lens is positioned adjacent to one end of the optical fiber, and wherein the rotational axis of the rod lens, receptacle, and optical fiber is co-linear with the optical axis to minimize rotational modulation.

21. A rotatable optical fiber coupler according to claim 20, wherein a refractive index matching epoxy binds the rod lens to the optical fiber.

22. A rotatable optical fiber coupler according to claim 20, the receptacle further including a plurality of a axially directed screws for annular adjustment of the receptacle, optical fiber, and rod lens with respect to the optical axis.

23. A rotatable optical fiber coupler according to claim 20, wherein the adjacent ends of the optical fiber and the lens are angled to minimize back reflection.

24. A rotatable optical fiber coupler according to claim 20, wherein the end of the lens located opposite to the end of the lens adjacent to the optical fiber is angled to minimize back reflection.

25. A rotatable optical fiber coupler according to claim 20, wherein the end of the lens located opposite to the end of the lens adjacent to the optical fiber is coated with an anti-reflection coating to minimize back reflection.

26. A rotatable optical fiber coupler according to claim 20, wherein the lens is a collimating lens.

27. A rotatable optical fiber coupler according to claim 20, the lens being a one-quarter pitched graded index fiber lens.

28. A rotatable optical fiber coupler according to claim 20, wherein the lens is a focusing lens.

29. A rotatable optical fiber coupler according to claim 20, the receptacle further including a plurality of radially directed screws and opposing spring plungers for adjusting the concentricity of the receptacle, rod lens, and optic fiber with respect to the optical axis.

30. A rotatable optical fiber coupler for single mode optical fiber comprising:
a receptacle;
a single mode optical fiber, the optical fiber being fixedly secured within the receptacle and concentric to the optical axis of the rotatable optical fiber coupler;
an aspheric lens, the aspheric lens fixedly positioned laterally adjacent to one end of the optical fiber, wherein the rotational axis of the aspheric lens, receptacle, and optical fiber is aligned with the optical axis to minimize rotational modulation.

31. A rotatable optical fiber coupler according to claim 30, the receptacle further including a plurality of radially directed screws and opposing spring plungers for adjusting the concentricity of the receptacle, aspheric lens, and optic fiber with respect to the optical axis.

32. A rotatable optical fiber coupler according to claim 30, the end of the optical fiber located adjacent to the aspheric lens being angled to reduce back reflection.

33. A rotatable optical fiber coupler according to claim 30, the end of the optical fiber located adjacent to the aspheric lens being coated with anti-reflection coating to minimize back reflection.

34. A lens alignment assembly coupling the lens to a single mode optical fiber comprising:

a single mode optical fiber, the optical fiber having a certain outer diameter;

a lens positioned adjacent to one end of the optical fiber, the lens having a certain outer diameter;

a locating tube surrounding the lens and at least a portion of the optical fiber, the locating tube having a hollow bore, the bore having an internal diameter such that the tube forms a tight, sliding fit with the outside diameters of both the optical fiber and the lens so as to concentrically and axially align the lens and the optical fiber; and wherein a small gap is formed between the adjacent ends of the optical fiber and the lens and includes a refractive index matching gel located in the small gap.

35. A lens alignment assembly coupling the lens to a single mode optical fiber comprising:

a single mode optical fiber, the optical fiber having a certain outer diameter;

a lens positioned adjacent to one end of the optical fiber, the lens having a certain outer diameter;

a locating tube surrounding the lens and at least a portion of the optical fiber, the locating tube having a hollow bore, the bore having an internal diameter such that the tube forms a tight, sliding fit with the outside diameters of both the optical fiber and the lens so as to concentrically and axially align the lens and the optical fiber; and wherein a small gap is formed between the adjacent ends of the optical fiber and the lens and includes a refractive index matching epoxy located in the small gap.

36. A lens alignment assembly coupling the lens to a single mode optical fiber comprising:

a single mode optical fiber, the optical fiber having a certain outer diameter;

a lens positioned adjacent to one end of the optical fiber, the lens having a certain outer diameter, wherein the adjacent ends of the optical fiber and the lens are angled to minimize back reflection; and a locating tube surrounding the lens and at least a portion of the optical fiber, the locating tube having a hollow bore, the bore having an internal diameter such that the tube forms a tight, sliding fit with the outside diameters of both the optical fiber and the lens so as to concentrically and axially align the lens and the optical fiber.

* * * * *

UNITED STATES PATENT AND TRADEMARK OFFICE
CERTIFICATE OF CORRECTION

PATENT NO. : 6,263,133 B1
DATED : July 17, 2001
INVENTOR(S) : Hamm

It is certified that error appears in the above-identified patent and that said Letters Patent is hereby corrected as shown below:

Column 5,
Line 44, change "I" to -- "I" --.
Line 61, change "fiber 72" to -- fiber 4 --.

Column 7,
Line 54, change "32" to -- 34 --.

Column 8,
Line 1, change "4(b)" to -- 4(a) --.

Column 10,
Line 21, delete the "a" before "axially".

Signed and Sealed this

Thirteenth Day of August, 2002

*Attest:*

*Attesting Officer*

JAMES E. ROGAN
*Director of the United States Patent and Trademark Office*